United States Patent
Albrecht et al.

(10) Patent No.: US 11,805,579 B2
(45) Date of Patent: Oct. 31, 2023

(54) LIGHT FIXTURE WITH AT LEAST ONE LED

(71) Applicant: LEDVANCE GmbH, Garching bei Munich (DE)

(72) Inventors: Tony Albrecht, Bad Abbach (DE); Markus Hofmann, Bad Abbach (DE)

(73) Assignee: LEDVANCE GMBH, Garching bei Munich (DE)

( * ) Notice: Subject to any disclaimer, the term of this patent is extended or adjusted under 35 U.S.C. 154(b) by 0 days.

(21) Appl. No.: 16/092,902

(22) PCT Filed: Apr. 7, 2017

(86) PCT No.: PCT/EP2017/058374
§ 371 (c)(1),
(2) Date: Oct. 11, 2018

(87) PCT Pub. No.: WO2017/178361
PCT Pub. Date: Oct. 19, 2017

(65) Prior Publication Data
US 2019/0174602 A1    Jun. 6, 2019

(30) Foreign Application Priority Data

Apr. 14, 2016 (DE) .......................... 102016206316.2

(51) Int. Cl.
*H05B 35/00* (2006.01)
*F21K 9/232* (2016.01)
*H05B 45/00* (2022.01)
*F21Y 113/20* (2016.01)
*F21Y 115/10* (2016.01)

(52) U.S. Cl.
CPC ............. *H05B 35/00* (2013.01); *F21K 9/232* (2016.08); *H05B 45/00* (2020.01); *F21Y 2113/20* (2016.08); *F21Y 2115/10* (2016.08); *Y02B 20/30* (2013.01)

(58) Field of Classification Search
CPC . F21Y 2115/10; F21K 9/232; H05B 33/0845; H05B 33/0842; H05B 35/00
See application file for complete search history.

(56) References Cited

U.S. PATENT DOCUMENTS

| | | | |
|---|---|---|---|
| 3,771,018 A | 11/1973 | Medendorp et al. | |
| 4,074,168 A * | 2/1978 | T'Jampens | H01K 1/50 313/579 |
| 4,963,798 A * | 10/1990 | McDermott | H05B 45/00 315/312 |

(Continued)

FOREIGN PATENT DOCUMENTS

| | | | | |
|---|---|---|---|---|
| WO | WO-0101385 A1 * | 1/2001 | ............. | G08G 1/095 |
| WO | 03059012 A1 | 7/2003 | | |

(Continued)

*Primary Examiner* — Renan Luque
(74) *Attorney, Agent, or Firm* — Hayes Soloway PC

(57) ABSTRACT

A light fixture having at least one LED and at least one filament, wherein the at least one filament is connected in series to the at least one LED. A current supplied to the at least one LED in the light fixture is regulated by the electrical properties of the at least one filament. Thus the at least one LED in the light fixture can be run without an electrical driver.

19 Claims, 3 Drawing Sheets

(56) References Cited

U.S. PATENT DOCUMENTS

| | | | | |
|---|---|---|---|---|
| 5,343,122 A * | 8/1994 | Sugimori | ............. | H05B 39/041 |
| | | | | 315/209 R |
| 6,853,150 B2 * | 2/2005 | Clauberg | ........... | H05B 33/0815 |
| | | | | 315/185 R |
| 7,160,012 B2 * | 1/2007 | Hilscher | ................... | F21K 9/61 |
| | | | | 362/555 |
| 7,166,968 B2 * | 1/2007 | Janning | ................. | H05B 47/23 |
| | | | | 315/185 S |
| RE42,161 E * | 2/2011 | Hochstein | ........... | H02M 1/4208 |
| | | | | 363/89 |
| 8,228,002 B2 * | 7/2012 | Newman, Jr. | .......... | H05B 45/10 |
| | | | | 315/324 |
| 2005/0168156 A1 * | 8/2005 | Li | ...................... | H05B 33/0803 |
| | | | | 315/185 R |
| 2007/0076426 A1 * | 4/2007 | Kling | .................... | H05B 35/00 |
| | | | | 362/555 |
| 2008/0265801 A1 * | 10/2008 | Lee | .................... | H05B 45/3578 |
| | | | | 315/297 |
| 2010/0178204 A1 | 7/2010 | Yin et al. | | |
| 2010/0328946 A1 * | 12/2010 | Borkar | ................ | H05B 47/175 |
| | | | | 362/249.02 |
| 2011/0163675 A1 * | 7/2011 | Lin | ......................... | F21V 29/85 |
| | | | | 313/46 |
| 2011/0175540 A1 * | 7/2011 | Hsu | ........................ | H05B 45/40 |
| | | | | 315/307 |
| 2011/0181190 A1 * | 7/2011 | Lin | ........................ | H05B 45/20 |
| | | | | 315/127 |
| 2012/0162965 A1 * | 6/2012 | Takeuchi | ................. | F21V 9/32 |
| | | | | 362/84 |
| 2013/0058080 A1 * | 3/2013 | Ge | ........................ | H05B 45/357 |
| | | | | 362/249.02 |
| 2014/0361692 A1 * | 12/2014 | Huang | ................... | H05B 45/37 |
| | | | | 315/201 |
| 2015/0043212 A1 * | 2/2015 | Coffey | ...................... | F21K 9/23 |
| | | | | 362/294 |
| 2016/0099141 A1 * | 4/2016 | Reisman | ............. | H01L 51/5262 |
| | | | | 313/112 |
| 2017/0276298 A1 * | 9/2017 | Liu | ........................ | F21K 9/232 |

FOREIGN PATENT DOCUMENTS

| | | | | |
|---|---|---|---|---|
| WO | | 2010030336 A1 | 3/2010 | |
| WO | WO-2010030336 A1 * | | 3/2010 | ............. F21K 9/135 |

\* cited by examiner

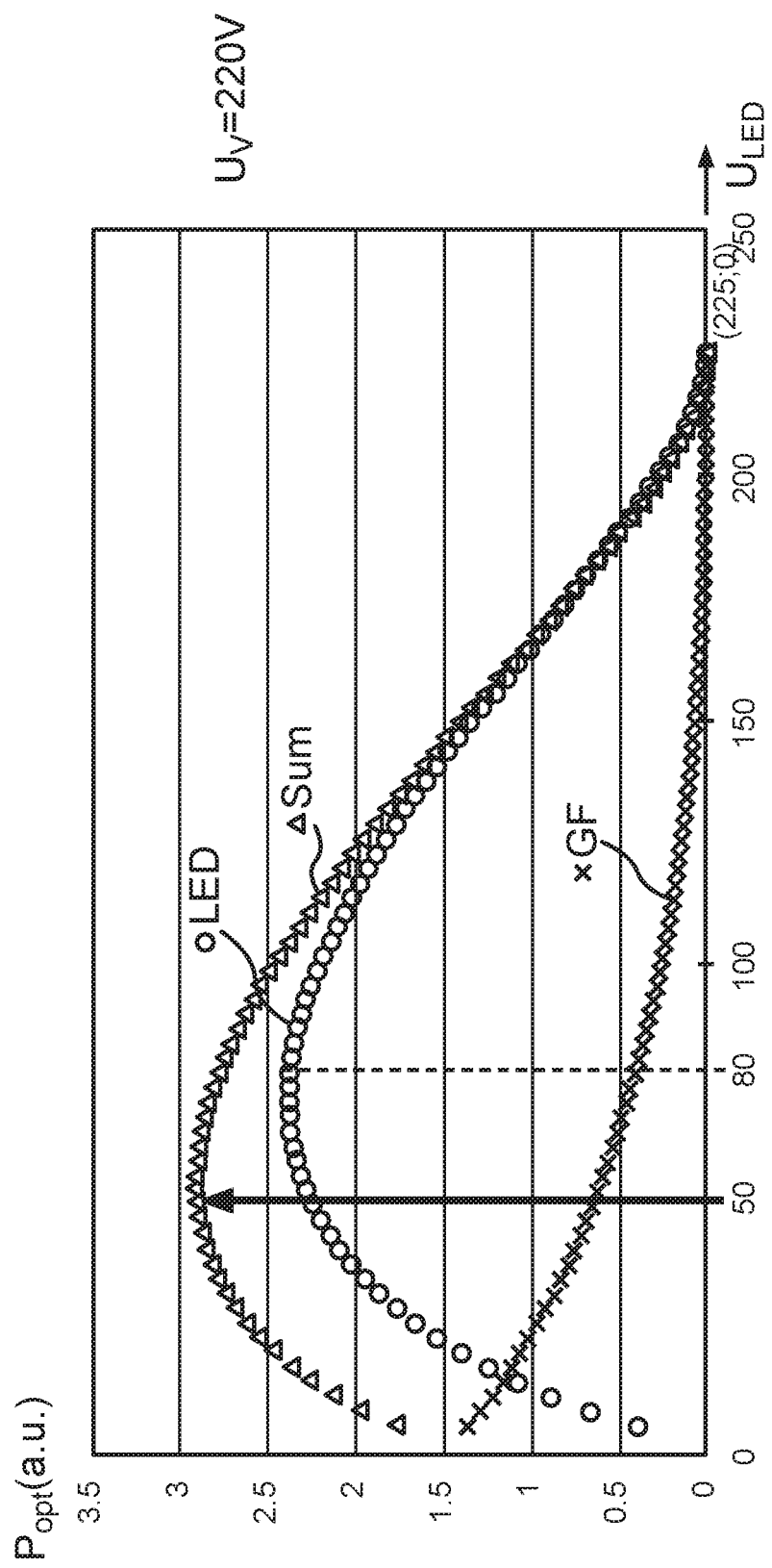

LIGHT FIXTURE WITH AT LEAST ONE LED

CROSS-REFERENCE TO RELATED APPLICATIONS AND PRIORITY

This patent application is a U.S. National Stage of International Patent Application No. PCT/EP2017/058374 filed on Apr. 7, 2017, which claims priority from German Patent Application No. 102016206316.2 filed on Apr. 14, 2016. Each of these patent applications is herein incorporated by reference in its entirety.

TECHNICAL FIELD

The present invention relates to a light fixture with at least one LED. Light fixtures with LEDs are characterized by a long service life and a high degree of efficiency. In order to operate them even in conventional sockets, so-called retrofit lamps can be obtained on the market which, in terms of their appearance, are similar to a common incandescent lamp however LEDs are used as light fixtures.

BACKGROUND

Since the introduction of LEDs in the production of retrofit lamps, great improvements have been achieved with regard to efficiency, color rendering, and service life. However, this is currently only possible with relatively high production costs. In particular when, for example, an entire building is to be changed over from incandescent lamps to retrofit lamps, considerable costs are involved. So either the conversion of only some of the light fixtures takes place or it does not take place at all. In this way, not only in relation to an individual building, but also worldwide, a considerable amount of energy is wasted. The resources required to provide this energy could be better used in other ways. Existing solutions require electronic drivers, which convert the mains alternating current voltage to a direct current voltage adapted to the respective LED. In most cases a switching power supply is used for this, for example a buck converter. Retrofit lamp are obtainable, in particular, as A-lamps, B-lamps, P-lamps, and G-lamps.

SUMMARY

The object of the present invention, therefore, is to provide an aforementioned light fixture, in particular a retrofit lamp, which is characterized by lower production costs than the known solutions.

This object is achieved by a light fixture with the features of claim 1.

The present invention is based on the finding that a retrofit lamp can be produced particularly advantageously if it functions without electronic drivers. In order to dispense with these drivers, an alternative device should be provided which is as cost-effective as possible in order to regulate the current through the at least one LED. According to the invention this function is performed by at least one filament which is serially connected to the at least one LED. Within the context of the present invention a filament is understood to be a conventional glow wire.

The invention makes use of the fact that as the temperature rises the electrical resistance of the filament likewise rises. In this way the current flow is reduced, so that the temperature falls. A falling temperature leads to a reduction in the electrical resistance, so that the current flow increases again, etc. In this way, on the one hand, the current supplied to the at least one LED is regulated and, on the other hand, a part of the current flowing through the regulating device in the form of the filament is likewise converted into light energy, as required in a light fixture. As a result, a light fixture can be provided which is characterized by a high degree of efficiency and a high proportion of LED light. The production costs are low, since no electronic driver circuit is required for the operation of the LEDs.

It is particularly advantageous that during the operation of a light fixture, according to the invention, a largely flicker-free operation can be achieved because the filament contributes a constant basic brightness to the radiation emitted by a light fixture, according to the invention, in the visible wavelength range. A further advantage can be seen in the fact that existing production concepts of incandescent lamps can be employed in the production.

A preferred variant of the present invention is characterized in that the light fixture comprises a glass bulb in which the at least one filament is arranged, wherein the glass bulb is filled with a protective gas. This protective gas preferably comprises a mixture of 93% argon and 7% nitrogen and in particular no halogen. Therefore the mixture is like that of commercially available incandescent lamps. The at least one LED and the at least one filament are preferably both arranged inside the glass bulb.

In another variant of the present invention, the light fixture comprises a glass bulb in which the at least one filament is arranged, wherein the glass bulb is filled with a gas which comprises at least one halogen, in particular bromine. As a result, a halogen bulb is obtained, wherein a glass bulb can be provided that comprises an arrangement of the filament and the at least one LED. Accordingly, in this variant the at least one LED and the at least one filament are exposed to different atmospheric boundary conditions.

The light fixture preferably has a first and a second connector for coupling to a supply voltage, in particular an alternating current supply voltage. In this connection it can be provided that the light fixture comprises at least one first LED and one second LED which are connected to one another in an antiparallel arrangement. In this way both partial waves of the alternating current supply voltage can be used. In this way possible flickering can be further reduced.

In another embodiment the light fixture can comprise a rectifier which is coupled to the first and the second connector. In particular in this variant the light fixture can comprise at least one first LED and one second LED which are connected to one another in parallel. This likewise results in reduced flickering.

However, two LEDs connected to one another in parallel can also be used in a variant without a rectifier if, for example, at least two LEDs are connected to one another in parallel and at least two further LEDs are connected to the first parallel connection in an antiparallel arrangement.

Furthermore, it may be provided that the light fixture comprises at least one first LED and one second LED which are connected to one another in series. In this case the LEDs form a so-called LED string. This may be the case both in the variant with a rectifier and in the variant without a rectifier. Thus, the entire voltage occurring over the LED string can be increased and thus the working point of the LED string can be optimized.

According to a further embodiment at least one first LED and one second LED can have a different forward voltage. This results in the advantage that the half-wave of the supplying alternating current voltage can be used particularly efficiently.

Furthermore, it may be provided that the light fixture comprises at least two LEDs which emit in different wavelength ranges. In this way the color point of the light emitted by a light fixture according to the invention can be set.

It has proved particularly advantageous if the at least one LED and the at least one filament are designed in such a way that between 15% and 30%, preferably between 20% and 25%, of the voltage drop occurs on the at least one LED. Due to such design, a maximum brightness of the radiation emitted by the light fixture can be achieved at a given supply voltage. Such design therefore results in a particularly high degree of efficiency of the light fixture.

In an alternative embodiment it can be provided that the at least one LED and the at least one filament are designed in such a way that between 70% and 90%, preferably between 75% and 85%, in particular 80%, of the optical power is produced by the at least one LED. The design rules proposed as advantageous in the last two paragraphs apply both for implementation of the filament in a protective gas and also inside a halogen bulb.

With such design a particularly high degree of efficiency and thus a particularly great optical performance can also be achieved at a predetermined supply voltage.

In an advantageous further embodiment, the light fixture comprises a glass bulb as well as a thermal shield, wherein the at least one LED and the at least one filament are arranged in the glass bulb, wherein the thermal shield is arranged between the at least one LED and the at least one filament. The thermal shield may be a metallic reflector which is mounted between the at least one LED and the filament.

Further advantageous embodiments are disclosed by the subordinate claims.

BRIEF DESCRIPTION OF THE DRAWINGS

Exemplary embodiments of the present invention are described in greater detail below with reference to the appended drawings. In the drawings:

FIG. 5 shows the optical performance $P_{opt}$ as a function of the voltage $U_{LED}$ occurring across the LEDs at a supply voltage of $U_V=220$ V.

DETAILED DESCRIPTION

The same references are used below for elements which are the same and equivalent.

Figure 1:
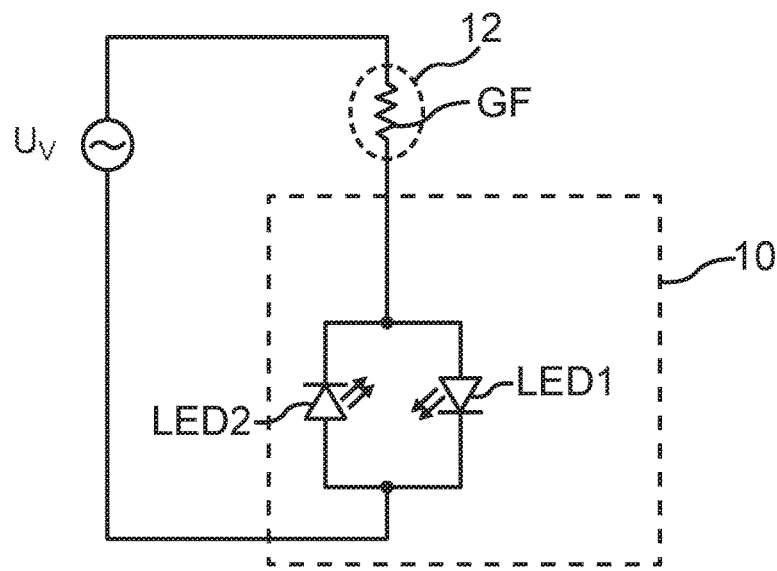
FIG. 1 shows a schematic representation of a wiring diagram for a first exemplary embodiment of a light fixture according to the invention.

FIG. 1 shows a schematic representation of a wiring diagram for a first exemplary embodiment of a light fixture according to the invention. An alternating current voltage source $U_V$, which can for example provide an alternating current voltage with an amplitude of 220 V, serves as voltage supply. The series connection of a filament GF and two LEDs (LED1, LED2) are connected in an antiparallel arrangement and are coupled between connectors of the alternating current voltage source $U_V$. The region 10 shown by a broken line indicates which components can preferably be arranged on a printed circuit board.

As can be seen, the filament GF is not arranged on the printed circuit board 10. The outline 12 shown by a broken line should indicate that the filament GF can be operated in the same atmosphere as the LEDs, for example in a protective gas known from conventional incandescent lamps, which preferably comprises a mixture of 93% argon and 7% nitrogen, but no halogen. Alternatively, the filament GF can be operated in a different atmosphere as the LEDs (LED1, LED2) in order to produce a halogen bulb by means of the filament GF. In this case the filament GF is operated in a separate glass bulb which is filled with a gas which comprises at least one halogen, in particular bromine.

The exemplary embodiment illustrated in FIG. 1 has the advantage that through the illustrated antiparallel connection of the two LEDs (LED1, LED2), both partial waves of the alternating current supply voltage $U_V$ can be used for generating LED light. As is obvious for a person skilled in the art, further LEDs could be connected in parallel to the two LEDs (LED1, LED2) preferably in two antiparallel packages, in order to minimize fluctuations in brightness. Furthermore, one or more LEDs can be connected in series to each LED (LED1, LED2), in each case also in two antiparallel packages in order to prevent fluctuations in brightness. One LED (LED1 or LED2) can consist, for example, of several semiconductor chips, for example 3 V (InGaN), and several high voltage chips, for example 48 V, which are connected in series or in parallel. Thus, the operation of the LEDs can be adapted in a suitable manner to the alternating current supply voltage $U_V$.

Figure 2:
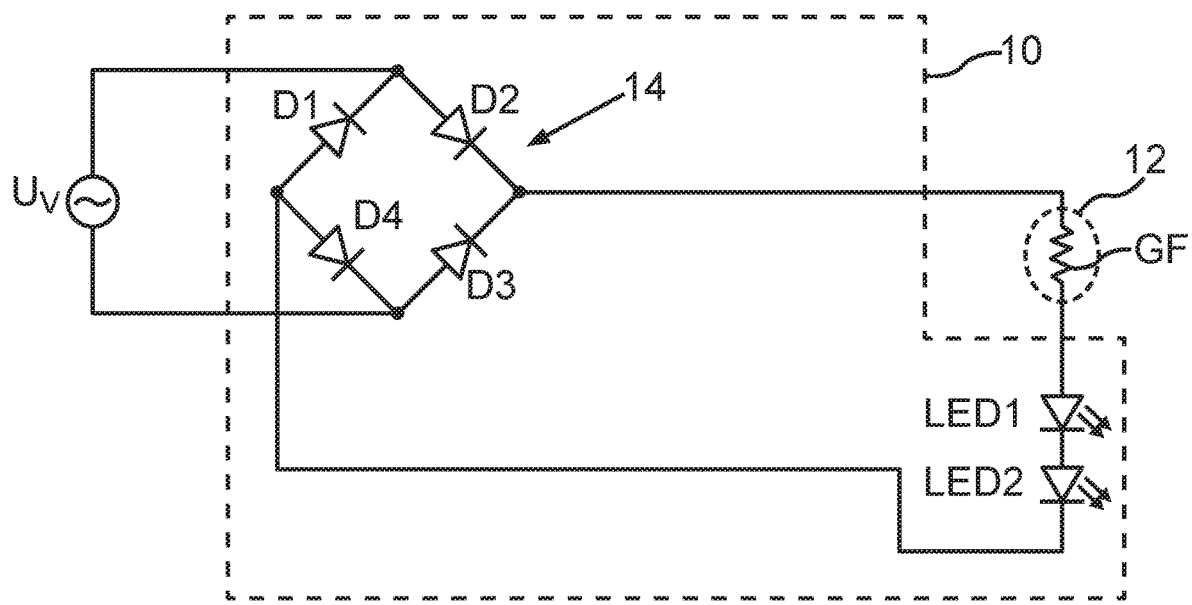
FIG. 2 shows a schematic representation of a wiring diagram for a second exemplary embodiment of a light fixture according to the invention.

In the exemplary embodiment of a light fixture according to the invention which is illustrated in FIG. 2, a bridge rectifier 14 is connected between the two connectors of the alternating current supply voltage $U_V$, which comprises four diodes, D1, D2, D3, D4, in a known manner. The series connection of a filament GF and two LEDs (LED1, LED2) is connected between the outputs of the bridge rectifier 14. Two LEDs (LED1, LED2) as well as the bridge rectifier 14 are arranged on a circuit board 10. Instead of the series connection of the two LEDs (LED1, LED2) illustrated in FIG. 2, several LEDs can also be connected in parallel, wherein in turn each LED connected in parallel can be replaced by a series connection of several LEDs. In this way—this also applies for FIG. 1—an optimal co-ordination between the alternating current supply voltage $U_V$, the filament GF, and the LEDs can be achieved in order to set a brightness of the light emitted by a light fixture according to the invention or the color point as required. Thus, furthermore, an optimal distribution of the alternating current supply voltage $U_V$ between the LEDs and the filament GF can be set.

The resistance of the filament GF defines the current also flowing through the at least one LED. The ratio of the light from the at least one LED and from the filament GF can be set, as mentioned, by means of a suitable choice of the resistance of the filament GF. The light of the two light sources is mixed, so that an efficient and, at the same time, largely flicker-free light is generated.

Figure 3:
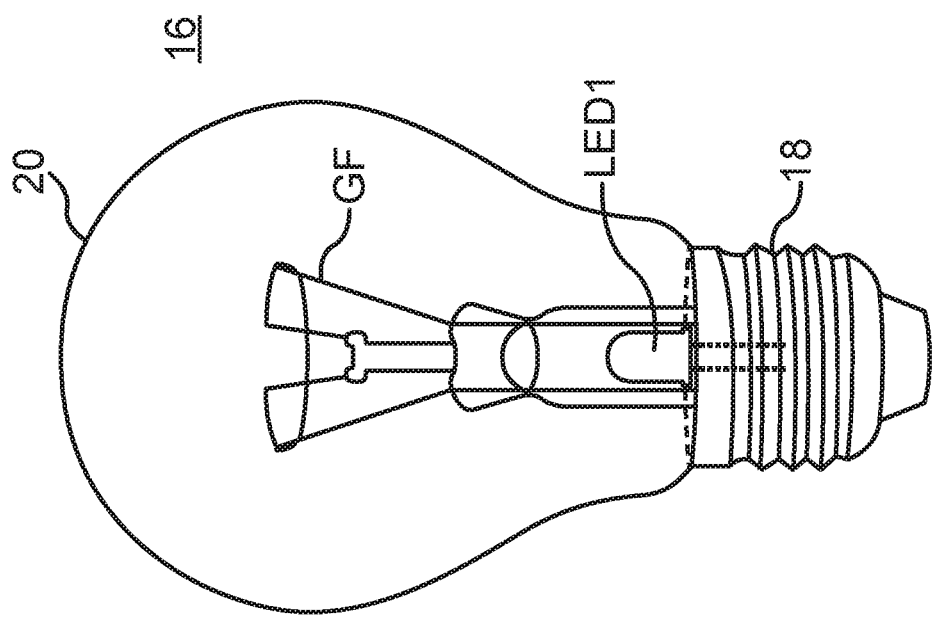
FIG. 3 shows a schematic representation of an exemplary embodiment of a light fixture according to the invention.

FIG. 3 shows an exemplary embodiment of a light fixture 16 according to the invention using the example of an A-lamp with a base 18 of the E27 type. This has a glass bulb 20, filled with a protective gas atmosphere, conventional for incandescent lamps, which can, for example, comprise 93% argon and 7% nitrogen, but no halogen. A filament GF and a plurality of LEDs, of which a LED (LED1) is illustrated to exemplify at least one LED, are arranged inside the glass bulb 20. In order to thermally decouple the LED (LED1) and the filament GF, the LED (LED1) is arranged close to the base 18, and the filament GF thereof is spatially separated therefrom as far as possible. Due to this spatial separation the service life of the LED (LED1) is not negatively influenced by the thermal radiation emitted by the filament GF. For further thermal decoupling, or alternatively, a thermal shield could be arranged between the LED (LED1) and the filament GF. This may for example be a metallic reflector.

Figure 4:
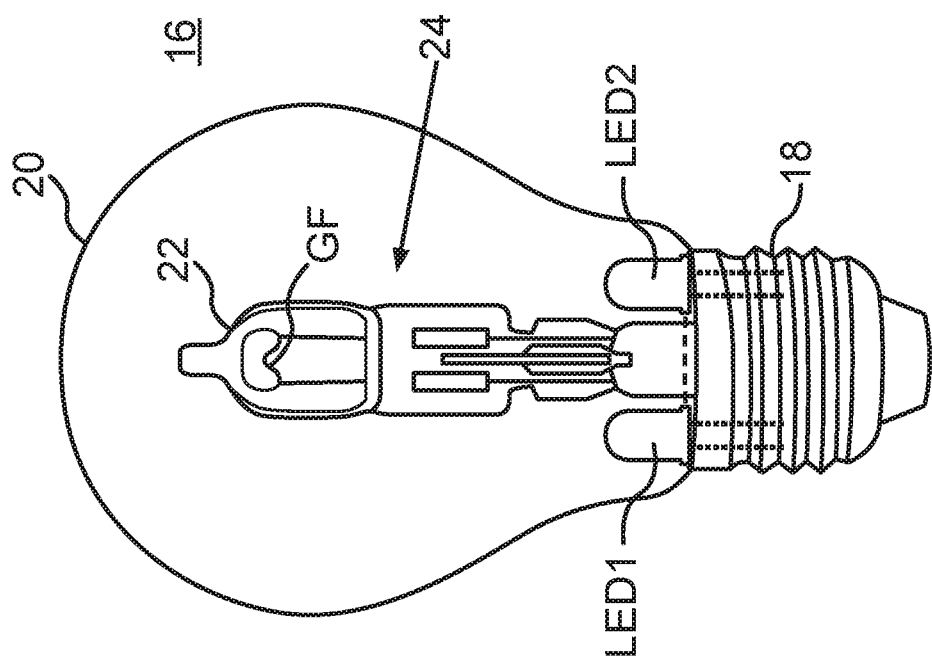
FIG. 4 shows a schematic representation of a further exemplary embodiment of a light fixture according to the invention.

In the exemplary embodiment illustrated in FIG. 4 of a light fixture 16 according to the invention, a further glass bulb 22 in which the filament GF is arranged is arranged inside the glass bulb 20. The atmosphere inside the glass bulb 22 contains at least one halogen, in particular bromine. In this case a halogen bulb 24 is produced by the filament GF and the glass bulb 22 together with the filling. The protective gas atmosphere already known from the exemplary embodiment illustrated in FIG. 3 can be provided inside the glass bulb 20. In this case two LEDs (LED1, LED2) are arranged inside the glass bulb 20, but outside the glass bulb 22. Of course, there can be one or more of LEDs, for example one, two, three, four etc.

FIG. 5 shows the characteristic of the optical output $P_{opt}$ (a.u.=arbitrary units) as a function of the voltage $U_{LED}$ occurring across the at least one LED at a supply voltage of $U_V$=220 V. The difference between the alternating current supply voltage $U_V$ and the voltage occurring across the at least one LED therefore corresponds to the voltage occurring across the filament GF.

Accordingly, the working point is fixed by means of the number of LEDs connected in series, i.e. in particular the forward voltages thereof, as well as the resistance of the filament GF. As can be seen, the optical performance $P_{opt}$ emitted by the filament GF is greater the lower the voltage $U_{LED}$ is across the at least one LED. In the case of the proportion of the optical performance $P_{opt}$ supplied by the at least one LED, a maximum is obtained at a voltage of $U_{LED}$=80 V. For the sum of the two optical partial powers, i.e. the power of the filament GF as well as the power of the at least one LED, a maximum is obtained at a voltage of $U_{LED}$=54 V. At this working point the entire system would achieve an efficiency greater than 20%. If it is assumed that an incandescent lamp usually has an efficiency between 2% and 5% this results in a significant increase in the efficiency relative to an incandescent lamp alone. If LEDs are operated alone, an efficiency between 25% and 30% could be achieved, but at the expense of a costly electronic driver. This electronic driver can be omitted in a light fixture according to the invention. In this respect it should be noted that a maximum degree of efficiency can be achieved if the at least one LED and the at least one filament are designed in such a way that between 20% and 25% of the voltage drop occurs on the at least one LED. Conversely, from the representation of FIG. 5 it may be concluded that an optimal degree of efficiency is produced when the at least one LED and the at least one filament GF are designed in such a way that between 75% and 85%, in particular 80%, of the optical performance $P_{opt}$ is generated by the at least one LED.

LIST OF REFERENCES 10 printed circuit board
12 outline
14 bridge rectifier
16 light fixture
18 base
20 glass bulb
22 glass bulb
24 halogen bulb
D1, D2, D3, D4 diodes
GF filament
LED1, LED2 LEDs
$P_{opt}$ optical performance
$U_{LED}$ voltage
$U_V$ supply voltage

The invention claimed is:

1. A light fixture comprising:
    at least one LED;
    at least one filament, wherein the at least one filament is a glow wire connected in series to the at least one LED, wherein a current flowing through the filament always flows from the filament to the at least one LED, wherein the current supplied to the at least one LED is regulated by the filament and a part of the current flowing through the filament is converted into light energy which is mixed with a light emitted by the at least one LED;
    a rectifier coupled in series to the at least one filament and the at least one LED; and
    a glass bulb, wherein the at least one filament and the at least one LED is arranged within the glass bulb.

2. The light fixture of claim 1, wherein the glass bulb is filled with at least one of a protective gas and a gas comprising at least one halogen.

3. The light fixture of claim 1, wherein the light fixture has a first connector and a second connector for coupling to a supply voltage.

4. The light fixture of claim 1, wherein the rectifier is not between the at least one filament and the at least one LED.

5. The light fixture of claim 1, wherein the at least one LED comprises:
    at least one first LED; and
    at least one second LED connected to the at least one first LED in parallel.

6. The light fixture of claim 1, wherein the at least one LED comprises:
    at least one first LED; and
    at least one second LED connected to the at least one first LED in series.

7. The light fixture of claim 1, wherein:
    the at least one LED comprises:
        at least one first LED; and
        at least one second LED connected to the at least one first LED; and
    the at least one first LED and the at least one second LED have a different forward voltage.

8. The light fixture of claim 1, wherein between 15% and 30% of a voltage drop across the at least one LED and the at least one filament occurs on the at least one LED.

9. The light fixture of claim 1, wherein between 20% and 25% of a voltage drop across the at least one LED and the at least one filament occurs on the at least one LED.

10. The light fixture of claim 1, wherein the light fixture comprises a thermal shield, wherein the thermal shield is arranged between the at least one LED and the at least one filament.

11. The light fixture of claim 1, wherein the at least one LED and the at least one filament generate an optical performance, wherein between 70% and 90% of the optical performance is generated by the at least one LED.

12. The light fixture of claim 1, wherein the at least one LED and the at least one filament generate an optical performance, wherein between 75% and 85% of the optical performance is generated by the at least one LED.

13. The light fixture of claim 1, wherein the at least one LED and the at least one filament generate an optical performance, wherein 80% of the optical performance is generated by the at least one LED.

14. The light fixture of claim 1, wherein the glass bulb is filled with a protective gas which comprises a mixture of 93% argon and 7% nitrogen.

15. A light fixture comprising:
   at least one LED;
   at least one filament, wherein the at least one filament is a glow wire connected in series to the at least one LED;
   a rectifier, wherein the rectifier is connected in series to the at least one filament and the at least one LED, such that the rectifier feeds a current to the at least one filament and the at least one filament feeds the current to the at least one LED, wherein the current supplied to the at least one LED is regulated by the filament and a part of the current flowing through the filament is converted into light energy which is mixed with a light emitted by the at least one LED; and
   a glass bulb, wherein the at least one filament and the at least one LED is arranged within the glass bulb.

16. A light fixture comprising:
   at least one LED;
   at least one filament, wherein the at least one filament is a glow wire connected in series to the at least one LED;
   a rectifier, having at least two nodes, wherein the series connection of the at least one filament and the at least one LED is connected between the at least two nodes of the rectifier, wherein a current supplied to the at least one LED is regulated by the filament and a part of the current flowing through the filament is converted into light energy which is mixed with a light emitted by the at least one LED; and
   a glass bulb, wherein the at least one filament and the at least one LED is arranged within the glass bulb.

17. The light fixture of claim 16, wherein the at least two nodes comprises four nodes, wherein:
   a first node and a second node are connected to a power source;
   a third node is connected to the at least one LED; and
   a fourth node is connected to the at least one filament.

18. The light fixture of claim 1, wherein:
   the at least one LED and the bridge rectifier share a printed circuit board; and
   the at least one filament is not on the printed circuit board.

19. The light fixture of claim 1, wherein within the glass bulb:
   the at least one LED is disposed in a first gaseous atmosphere; and
   the at least one filament is disposed in a second gaseous atmosphere which differs from the first gaseous atmosphere.

* * * * *